June 10, 1952     P. H. TAYLOR     2,599,669
THREE COMPONENT FOUR-ELEMENT OBJECTIVE
Filed May 9, 1950
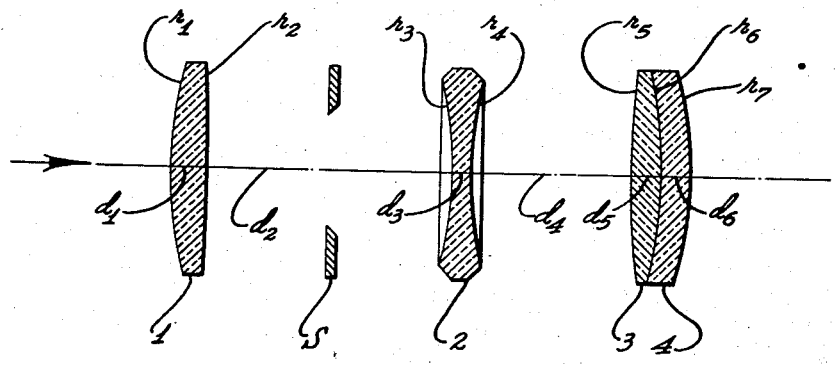
INVENTOR:
PHILIP H. TAYLOR
BY Herbert E. Metcalf
HIS PATENT ATTORNEY Patented June 10, 1952

2,599,669

UNITED STATES PATENT OFFICE 2,599,669

THREE-COMPONENT FOUR-ELEMENT OBJECTIVE

Philip H. Taylor, Los Angeles, Calif., assignor to Northrop Aircraft, Inc., Hawthorne, Calif., a corporation of California Application May 9, 1950, Serial No. 160,885

1 Claim. (Cl. 88—57)

This invention relates to a four-element objective. It is an object of the invention to provide a four-element lens that will perform as satisfactorily as a high-quality doublet would on the axis and which also will give a well corrected full field of at least five degrees.

The lens of the present invention is achromatized at the wave lengths 4047 ($h$ line of mercury) and 5893 (D line of sodium) with the aim to correct for spherical aberration and coma at 4861 angstroms (F line of hydrogen). The lens of the present invention is completely free of appreciable spherical aberration and coma for all wavelengths in the range D to $h$.

The only serious residual aberrations in an image produced by the lens of the present invention are chromatic. They are: secondary color (axial) and lateral color (oblique). Both are about twice the tolerance set by the Rayleigh limits.

It has been found however, that D and $h$ achromatization with spherical and coma correction at F is satisfactory for energization of a 1P21 photocell (S4 surface), when the source is a star of an average spectral class (e. g., the sun) and even when dense flint elements, which have serious energy absorption in the violet region, are used in the system.

Due to secondary color, this residual chromatism causes the red image at the focal point for wavelength 4047 ($h$ line of mercury) to have a diameter which is about the limit that can be tolerated.

Lateral color or chromatic difference of magnification causes a deterioration by the image 2½ degrees from the axis which is about as serious as that of secondary color on the axis. Since, at the edge of the field the two effects are additive, the limits of a really good image have been transgressed, and some light will be lost at the periphery of the field when it is 5 degrees in diameter.

All of the other aberrations have been reduced effectively to zero, for the objective of the present invention.

In the accompanying drawing, the figure is a diagrammatic sectional view of an objective according to this invention. The lens system comprises four lenses. Lens 1 is a bi-convex positive element. Lenses 3 and 4, a bi-convex and a concave-convex element, respectively, are cemented together to make up the back member. Lens 2 is a dispersive biconcave lens. A stop S is positioned between lenses 1 and 2.

Construction data for an objective, built in accordance with this invention follows:

| Prescription | Glass | 5893, $N_D$ | 4861, $N_F$ | 4047, $N_h$ | V |
|---|---|---|---|---|---|
| $r_1 = 3.146$<br>$d_1 = .280$<br>$r_2 = -65.64$<br>$d_2 = 1.621$ | BSC-2 | 1.51700 | 1.52262 | 1.53043 | 64.5 |
| $r_3 = -3.213$<br>$d_3 = .140$<br>$r_4 = 2.892$<br>$d_4 = .896$<br>$r_5 = 10.062$ | DF-2 | 1.61700 | 1.62904 | 1.64740 | 36.6 |
| $d_5 = .200$<br>$r_6 = -3.704$ | LBC-2 | 1.57250 | 1.57853 | 1.58951 | 57.4 |
| $d_6 = .220$<br>$r_7 = -2.880$ | BF-3 | 1.57044 | 1.57884 | 1.59118 | 48.1 |

Diameter all lenses $1.600 +.000 / -.002$
Clear aperture: 1.00000
Stop Diameter: $.800 \pm .010$
Pole of surface $r_3$ to stop: $.99460 \pm .010$
sin $^1U'_M$: .0023151
$f'$: 10.38590

Where $r$ denotes the radius of the lens surfaces from front to rear as indicated by respective subscripts, where $d_1$, $d_3$, $d_5$ and $d_6$ are axial component thicknesses from front to rear respectively, where $d_2$ is the axial distance between lenses 1 and 2, and where $d_4$ is the axial distance between lenses 2 and 3. (Note—For definition of symbols and aberration letters shown refer to A. E. Conrady: "Applied Optics and Optical Design," Part I, Oxford University Press, 1929.)

The prescription given herein can easily be varied to suit various purposes as may be desired, by a simple scaling procedure.

When the radii, thicknesses and diameters of the component lenses, for example, are each multiplied by a constant, and then multiplication is performed of effective focal length, back focal length, and the linear size of the field, of the original system by the same constant, precise values for the new system will be obtained. It is to be carefully noted that speed (or f/no.) and angular size of the field are not changed. Neither are the optical tolerances changed. It therefore follows that if a system of given focal length performs satisfactorily, its optical behavior can always be improved by constructing a smaller scale model. Larger scale models are limited only by multiplication of aberration to tolerance ratios.

What is claimed is:

A four element objective comprising three coaxial components of which the first is a bi-convex lens, the second a negative bi-concave lens and the third is a bi-convex lens cemented to a concave-convex lens, the objective being spherically corrected at D, F, and $h$ wavelengths, and chromatically corrected at D and $h$ wavelengths to provide a well corrected field of at least five degrees, and having a prescription as follows:

| Prescription | Glass | $N_D$ | $N_F$ | $N_h$ | V |
|---|---|---|---|---|---|
| $r_1 = 3.146$ | | | | | |
| $d_1 = .280$ | BSC-2 | 1.51700 | 1.52262 | 1.53043 | 64.5 |
| $r_2 = -65.64$ | | | | | |
| $d_2 = 1.621$ | | | | | |
| $r_3 = -3.213$ | | | | | |
| $d_3 = .140$ | DF-2 | 1.61700 | 1.62904 | 1.64740 | 36.6 |
| $r_4 = 2.892$ | | | | | |
| $d_4 = .896$ | | | | | |
| $r_5 = 10.062$ | | | | | |
| $d_5 = .200$ | LBC-2 | 1.57250 | 1.57853 | 1.58951 | 57.4 |
| $r_6 = -3.704$ | | | | | |
| $d_6 = .220$ | BF-3 | 1.57044 | 1.57884 | 1.59118 | 48.1 |
| $r_7 = -2.880$ | | | | | | where $r$ is the radius length for an element surface;

$d$ is the axial thickness of an element;

$N_D$ is the index of refraction for the D line of sodium (5893 Å);

$N_F$ is the index of refraction for the F line of hydrogen (4861 Å);

$N_h$ is the index of refraction for the $h$ line of mercury (4047 Å); and $$V = \frac{N_D - 1}{N_F - N_h}$$

BSC-2 is a type of boro-silicate crown glass well known in the art;

DF-2 is a type of dense flint glass well known in the art;

LBC-2 is a type of light barium crown glass well known in the art; and

BF-3 is a type of barium flint glass well known in the art.

PHILIP H. TAYLOR.

REFERENCES CITED

The following references are of record in the file of this patent:

UNITED STATES PATENTS

| Number | Name | Date |
|---|---|---|
| 721,240 | Rudolph | Feb. 24, 1903 |
| 2,158,178 | Frederick et al | May 16, 1939 |
| 2,165,328 | Aklin et al. | July 11, 1939 |
| 2,336,301 | Schade et al | Dec. 7, 1943 |
| 2,443,156 | Altman et al. | June 8, 1948 |
| 2,502,508 | Cook | Apr. 4, 1950 |

FOREIGN PATENTS

| Number | Country | Date |
|---|---|---|
| 209,371 | Great Britain | Jan. 10, 1924 |